(12) United States Patent
Munige et al.

(10) Patent No.: US 10,408,996 B2
(45) Date of Patent: Sep. 10, 2019

(54) NON-ZERO DISPERSION SHIFTED FIBER WITH LOW CUT OFF WAVELENGTH AND LARGE EFFECTIVE AREA

(71) Applicant: Sterlite Technologies Limited, Aurangabad (IN)

(72) Inventors: Srinivas Reddy Munige, Aurangabad (IN); MalleswaraRao Lanke, Aurangabad (IN); Radhika Velayudhan, Aurangabad (IN); Anand Pandey, Aurangabad (IN)

(73) Assignee: STERLITE TECHNOLOGIES LIMITED, Aurangabad, MH (IN)

( * ) Notice: Subject to any disclaimer, the term of this patent is extended or adjusted under 35 U.S.C. 154(b) by 20 days.

(21) Appl. No.: 15/942,303

(22) Filed: Mar. 30, 2018

(65) Prior Publication Data

US 2019/0162898 A1  May 30, 2019

(51) Int. Cl.
*G02B 6/036* (2006.01)
*G02B 6/02* (2006.01)
*G02B 6/028* (2006.01)

(52) U.S. Cl.
CPC ..... *G02B 6/02271* (2013.01); *G02B 6/02014* (2013.01); *G02B 6/0281* (2013.01); *G02B 6/03644* (2013.01)

(58) Field of Classification Search
CPC ............ G02B 6/02271; G02B 6/02014; G02B 6/0281; G02B 6/03644
See application file for complete search history.

(56) References Cited

U.S. PATENT DOCUMENTS

| | | | | |
|---|---|---|---|---|
| 2005/0111803 A1* | 5/2005 | Bickham | ............ | G02B 6/02014 385/123 |
| 2007/0116416 A1* | 5/2007 | Chen | ........................ | G02B 6/02 385/123 |

\* cited by examiner

*Primary Examiner* — Chris H Chu

(57) ABSTRACT

The present disclosure provides an optical fiber. The optical fiber includes a core region. The core region is defined by a region around central longitudinal axis of the optical fiber. In addition, the core region has a first annular region. The first annular region is defined from the central longitudinal axis to a first radius $r_1$ from the central longitudinal axis. Moreover, the core region has a second annular region. The second annular region is defined from the first radius $r_1$ to a second radius $r_2$. Further, the core region has a third annular region. The third annular region is defined from the second radius $r_2$ to a third radius $r_3$. Also, the optical fiber includes a cladding. The cladding region has a fourth radius $r_4$.

13 Claims, 3 Drawing Sheets

NON-ZERO DISPERSION SHIFTED FIBER WITH LOW CUT OFF WAVELENGTH AND LARGE EFFECTIVE AREA

TECHNICAL FIELD

The present disclosure relates to the field of optical fiber transmission. More particularly, the present disclosure relates to a non-zero dispersion shifted fiber having a large effective area. The present application is based on, and claims priority from an Indian Application Number 201711043033 filed on 30 Nov. 2017 the disclosure of which is hereby incorporated by reference herein.

BACKGROUND

The optical fiber finds wide usage in optical-fiber transmission over the last few years. One such type of optical fiber is non-zero dispersion shifted optical fiber used in wavelength division multiplexing systems for long haul applications. Typically, the performance of these optical fibers is determined based on a reduction in dispersion and bending losses over a broad range of bandwidth. In general, the dispersion and bending losses are minimized based on a refractive index profile. The refractive index profile defines the properties of a core section and a cladding section. Also, the refractive index profile illustrates a relationship between the refractive index of the optical fiber with a radius of the optical fiber. Further, this profile is determined based on a concentration of dopants and materials used during manufacturing. Furthermore, the dispersion and bending losses are controlled by varying the refractive index profile.

Currently deployed non-zero dispersion shifted fibers have certain drawbacks. The non-zero dispersion shifted fibers of G.655 category exhibit high macro bending losses and dispersion values leading to increase in system penalty and network budget. This leads to reduction in reliability of optical fiber under bending conditions.

In light of the above stated discussion, there is a need for an optical fiber that has low macro bending losses and low dispersion values while being suitable for WDM systems in long haul communications.

SUMMARY

In a first example, a non-zero dispersion shifted optical fiber with large effective area is provided. The optical fiber includes a core region. A core region is defined by a region around a central longitudinal axis. In addition, the core region has a first annular region. The first annular region is defined from the central longitudinal axis to a first radius $r_1$ from the central longitudinal axis of the optical fiber. The first annular region has a refractive index $delta_1$. The first annular region has a parameter Y (gamma). The first annular region in the core region has a super Gaussian profile. Moreover, the core region has a second annular region. The second annular region is defined from the first radius $r_1$ to a second radius $r_2$ from the central longitudinal axis of the optical fiber. The second annular region has a refractive index $delta_2$. Further, the core region has a third annular region. The third annular region is defined from the second radius $r_2$ to a third radius $r_3$ from the central longitudinal axis of the optical fiber. The third annular region has a refractive index $delta_3$. The first annular region, the second annular region and the third annular region are concentrically arranged. In addition, the optical fiber includes a cladding. The cladding is defined by a fourth annular region extended from the third radius $r_3$ to a fourth radius $r_4$ from the central longitudinal axis of the optical fiber. The cladding has a fourth refractive index $delta_4$. The fourth annular region concentrically surrounds the third annular region. The optical fiber has a first set of values defined for a plurality of parameters of the optical fiber including the first radius $r_1$, the first refractive index $delta_1$, the Y (gamma), the second radius $r_2$, the second refractive index $delta_2$, the third radius $r_3$, the third refractive index $delta_3$, the fourth radius $r_4$, the fourth refractive index $delta_4$, a cutoff wavelength, an effective area, a macro bending loss, a mode field diameter, a dispersion value, a zero dispersion wavelength and an attenuation. The first radius $r_1$ is in range of 4 microns to 5 microns in the first set of values. The first refractive index $delta_1$ is in range of 0.5 to 0.57 in the first set of values. The Y (gamma) is in the range of 3 to 6 in the first set of values. The second radius $r_2$ is in range of 5 microns to 6.5 microns in the first set of values. The second refractive index $delta_2$ is zero in the first set of values. The third radius $r_3$ is in range of 8.8 microns to 10.5 microns in the first set of values. The third refractive index $delta_3$ is in range of 0.27 to 0.32 in the first set of values. The fourth radius $r_4$ is 62.5 microns in the first set of values. The fourth refractive index $delta_4$ is zero in the first set of values. The optical fiber has a second set of values defined for the plurality of parameters of optical fiber including the first radius $r_1$, the first refractive index $delta_1$, the Y (gamma), the second radius $r_2$, the second refractive index $delta_2$, the third radius $r_3$, the third refractive index $delta_3$, the fourth radius $r_4$, the fourth refractive index $delta_4$, a cutoff wavelength, an effective area, a macro bending loss, a mode field diameter, a dispersion value, a zero dispersion wavelength and an attenuation. The first radius $r_1$ is in the range of 4 microns to 4.8 microns in the second set of values. The first refractive index $delta_1$ is in the range of 0.51 to 0.57 in the second set of values. The Y (gamma) is in the range of 3 to 6 in the second set of values. The second radius $r_2$ is in the range of 5 microns to 6.8 microns in the second set of values. The second refractive index $delta_2$ is zero in the second set of values. The third radius $r_3$ is in the range of 8.5 microns to 9.5 microns in the second set of values. The third refractive index $delta_3$ is in the range of 0.25 to 0.3 in the second set of values. The fourth radius $r_4$ is 62.5 microns in the second set of values. The fourth refractive index $delta_4$ is zero in the second set of values. The optical fiber has the cable cut-off wavelength of less than or equal to 1260 nm in the second set of values.

In a second example, a non-zero dispersion shifted optical fiber with large effective area is provided. The optical fiber includes a core region. A core region is defined by a region around a central longitudinal axis. In addition, the core region has a first annular region. The first annular region is defined from the central longitudinal axis to a first radius r1 from the central longitudinal axis of the optical fiber. The first annular region has a refractive index delta1. The first annular region has a parameter Y (gamma). The first annular region in the core region has a super Gaussian profile. Moreover, the core region has a second annular region. The second annular region is defined from the first radius r1 to a second radius r2 from the central longitudinal axis of the optical fiber. The second annular region has a refractive index delta2. Further, the core region has a third annular region. The third annular region is defined from the second radius r2 to a third radius r3 from the central longitudinal axis of the optical fiber. The third annular region has a refractive index delta3. The first annular region, the second annular region and the third annular region are concentrically arranged. In addition, the optical fiber includes a cladding. The cladding is defined by a fourth annular region extended from the third radius r3 to a fourth radius r4 from the central longitudinal axis of the optical fiber. The cladding has a fourth refractive index delta4. The fourth annular region concentrically surrounds the third annular region. The optical fiber has a first set of values defined for a plurality of parameters of the optical fiber including the first radius r1, the first refractive index delta1, the Y (gamma), the second radius r2, the second refractive index delta2, the third radius r3, the third refractive index delta3, the fourth radius r4, the fourth refractive index delta4, a cutoff wavelength, an effective area, a macro bending loss, a mode field diameter, a dispersion value, a zero dispersion wavelength and an attenuation. The first radius r1 is in range of 4 microns to 5 microns in the first set of values. The first refractive index delta1 is in range of 0.5 to 0.57 in the first set of values. The Y (gamma) is in the range of 3 to 6 in the first set of values. The second radius r2 is in range of 5 microns to 6.5 microns in the first set of values. The second refractive index delta2 is zero in the first set of values. The third radius r3 is in range of 8.8 microns to 10.5 microns in the first set of values. The third refractive index delta3 is in range of 0.27 to 0.32 in the first set of values. The fourth radius r4 is 62.5 microns in the first set of values. The fourth refractive index delta4 is zero in the first set of values. The optical fiber has a cable cutoff wavelength of less than or equal to 1450 nm in the first set of values. The effective area is in the range of 66 um2 to 78 um2 at a wavelength of 1550 nm in the first set of values. The optical fiber has a macro bending loss of less than 0.1 dB/turn for 16 mm bending radius at a wavelength of 1625 nm in the first set of values. The optical fiber has a macro bending loss of less than 0.05 dB/100 turns for 30 mm bending radius at a wavelength of 1550 nm in the first set of values. The optical fiber has a second set of values defined for the plurality of parameters of optical fiber including the first radius r1, the first refractive index delta1, the Y (gamma), the second radius r2, the second refractive index delta2, the third radius r3, the third refractive index delta3, the fourth radius r4, the fourth refractive index delta4, a cutoff wavelength, an effective area, a macro bending loss, a mode field diameter, a dispersion value, a zero dispersion wavelength and an attenuation. The first radius r1 is in the range of 4 microns to 4.8 microns in the second set of values. The first refractive index $delta_1$ is in the range of 0.51 to 0.57 in the second set of values. The Y (gamma) is in the range of 3 to 6 in the second set of values. The second radius r2 is in the range of 5 microns to 6.8 microns in the second set of values. The second refractive index delta2 is zero in the second set of values. The third radius r3 is in the range of 8.5 microns to 9.5 microns in the second set of values. The third refractive index delta3 is in the range of 0.25 to 0.3 in the second set of values. The fourth radius r4 is 62.5 microns in the second set of values. The fourth refractive index delta4 is zero in the second set of values. The optical fiber has the cable cut-off wavelength of less than or equal to 1260 nm in the second set of values. The effective area is in the range of 65 um2 to 73 um2 at a wavelength of 1550 nm in the second set of values. The optical fiber has the macro bending loss of less than 0.5 dB/turn for 16 mm bending radius at a wavelength of 1625 nm in the second set of values. The optical fiber has a macro bending loss of less than 0.05 dB/100 turns for 30 mm bending radius at a wavelength of 1550 nm in the second set of values.

In a third example, a non-zero dispersion shifted optical fiber with large effective area is provided. The optical fiber includes a core region. A core region is defined by a region around a central longitudinal axis. In addition, the core region has a first annular region. The first annular region is defined from the central longitudinal axis to a first radius r1 from the central longitudinal axis of the optical fiber. The first annular region has a refractive index delta1. The first annular region has a parameter Y (gamma). The first annular region in the core region has a super Gaussian profile. Moreover, the core region has a second annular region. The second annular region is defined from the first radius r1 to a second radius r2 from the central longitudinal axis of the optical fiber. The second annular region has a refractive index delta2. Further, the core region has a third annular region. The third annular region is defined from the second radius r2 to a third radius r3 from the central longitudinal axis of the optical fiber. The third annular region has a refractive index delta3. The first annular region, the second annular region and the third annular region are concentrically arranged. In addition, the optical fiber includes a cladding. The cladding is defined by a fourth annular region extended from the third radius r3 to a fourth radius r4 from the central longitudinal axis of the optical fiber. The cladding has a fourth refractive index delta4. The fourth annular region concentrically surrounds the third annular region. The optical fiber has a first set of values defined for a plurality of parameters of the optical fiber including the first radius r1, the first refractive index delta1, the Y (gamma), the second radius r2, the second refractive index delta2, the third radius r3, the third refractive index delta3, the fourth radius r4, the fourth refractive index delta4, a cutoff wavelength, an effective area, a macro bending loss, a mode field diameter, a dispersion value, a zero dispersion wavelength and an attenuation. The first radius r1 is in range of 4 microns to 5 microns in the first set of values. The first refractive index delta1 is in range of 0.5 to 0.57 in the first set of values. The Y (gamma) is in the range of 3 to 6 in the first set of values. The second radius r2 is in range of 5 microns to 6.5 microns in the first set of values. The second refractive index delta2 is zero in the first set of values. The third radius r3 is in range of 8.8 microns to 10.5 microns in the first set of values. The third refractive index delta3 is in range of 0.27 to 0.32 in the first set of values. The fourth radius r4 is 62.5 microns in the first set of values. The fourth refractive index delta4 is zero in the first set of values. The effective area is in the range of 66 um2 to 78 um2 at a wavelength of 1550 nm in the first set of values. The optical fiber has the mode field diameter in a range of 9.2 µm to 10 µm at a wavelength of 1550 nm in the first set of values. The optical fiber has the dispersion value in a range of −4.02 Ps/nm/km to 0.15 Ps/nm/km at a wavelength of 1460 nm in the first set of values. The optical fiber has the dispersion value in a range of 2.00 Ps/nm/km to 4.00 Ps/nm/km at a wavelength of 1530 nm in the first set of values. The optical fiber has the dispersion value in a range of 3.00 Ps/nm/km to 5.00 Ps/nm/km at a wavelength of 1550 nm in the first set of values. The optical fiber has the dispersion value in a range of 4.00 Ps/nm/km to 6.00 Ps/nm/km at a wavelength of 1565 nm in the first set of values. The optical fiber has the dispersion value in a range of 5.77 Ps/nm/km to 11.26 Ps/nm/km at a wavelength of 1625 nm in the first set of values. The optical fiber has the attenuation of less than 0.22 db/km at a wavelength of 1550 nm in the first set of values. The optical fiber has a second set of values defined for the plurality of parameters of the optical fiber including the first radius r1, the first refractive index delta1, the Y (gamma), the second radius r2, the second refractive index delta2, the third radius r3, the third refractive index delta3, the fourth radius r4, the fourth refractive index delta4, a cutoff wavelength, an effective area, a macro bending loss, a mode field diameter, a dispersion value, a zero dispersion wavelength and an attenuation. The first radius r1 is in the range of 4 microns to 4.8 microns in the second set of values. The first refractive index delta1 is in the range of 0.51 to 0.57 in the second set of values. The Y (gamma) is in the range of 3 to 6 in the second set of values. The second radius r2 is in the range of 5 microns to 6.8 microns in the second set of values. The second refractive index delta2 is zero in the second set of values. The third radius r3 is in the range of 8.5 microns to 9.5 microns in the second set of values. The third refractive index delta3 is in the range of 0.25 to 0.3 in the second set of values. The fourth radius r4 is 62.5 microns in the second set of values. The fourth refractive index delta4 is zero in the second set of values. The effective area is in the range of 65 um2 to 73 um2 at a wavelength of 1550 nm in the second set of values. The optical fiber has the mode field diameter in a range of 9.20 μm to 10.00 μm at wavelength of 1550 nm in the second set of values. The optical fiber has the dispersion value in a range of −16.78 Ps/nm/km to −11.36 Ps/nm/km at a wavelength of 1310 nm in the second set of values. The optical fiber has the dispersion value in a range of −4.02 Ps/nm/km to 0.15 Ps/nm/km at a wavelength of 1460 nm in the second set of values. The optical fiber has the dispersion value in a range of 2.00 Ps/nm/km to 4 Ps/nm/km at a wavelength of 1530 nm in the second set of values. The optical fiber has the dispersion value in a range of 3.00 Ps/nm/km to 5.00 Ps/nm/km at a wavelength of 1550 nm in the second set of values. The optical fiber has the dispersion value in a range of 4.00 Ps/nm/km to 6.00 Ps/nm/km at a wavelength of 1565 nm in the second set of values. The optical fiber has the dispersion value in a range of 5.77 Ps/nm/km to 11.26 Ps/nm/km at a wavelength of 1625 nm in the second set of values. The optical fiber has the attenuation of less than 0.22 DB/Km at a wavelength of 1550 nm in the second set of values.

In an embodiment of the present disclosure, the optical fiber has the cutoff wavelength of less than or equal to 1450 nm in the first set of values.

In an embodiment of the present disclosure, the optical fiber has the effective area in a range of 66 um2 to 78 um2 at a wavelength of 1550 nm in the first set of values.

In an embodiment of the present disclosure, the optical fiber has the macro bending loss of less than 0.1 dB/turn for 16 mm bending radius at a wavelength of 1625 nm in the first set of values.

In an embodiment of the present disclosure, the optical fiber has the macro bending loss of less than 0.005 dB/100 turns for 30 mm bending radius at a wavelength of 1550 nm in the first set of values.

In an embodiment of the present disclosure, the mode field diameter is in the range of 9.2 μm to 10 μm at wavelength of 1550 nm in the first set of values.

In an embodiment of the present disclosure, the dispersion value is in the range of −4.02 Ps/nm/km to 0.15 Ps/nm/km at a wavelength of 1460 nm in the first set of values.

In an embodiment of the present disclosure, the dispersion value is in the range of 2.00 Ps/nm/km to 4.00 Ps/nm/km at a wavelength of 1530 nm in the first set of values.

In an embodiment of the present disclosure, the dispersion value is in the range of 3.00 Ps/nm/km to 5.00 Ps/nm/km at a wavelength of 1550 nm in the first set of values.

In an embodiment of the present disclosure, the dispersion value is in the range of 4.00 Ps/nm/km to 6.00 Ps/nm/km at a wavelength of 1565 nm in the first set of values.

In an embodiment of the present disclosure, the dispersion value is in the range of 5.77 Ps/nm/km to 11.26 Ps/nm/km at a wavelength of 1625 nm in the first set of values.

In an embodiment of the present disclosure, the attenuation is less than 0.22 db/km at a wavelength of 1550 nm in the first set of values.

In an embodiment of the present disclosure, the optical fiber has the cutoff wavelength of less than or equal to 1260 nm in the second set of values.

In an embodiment of the present disclosure, the optical fiber has the effective area in a range of 65 um2 to 73 um2 at a wavelength of 1550 nm in the second set of values.

In an embodiment of the present disclosure, the optical fiber has the macro bending loss of less than 0.5 dB/turn for 16 mm bending radius at a wavelength of 1625 nm in the second set of values.

In an embodiment of the present disclosure, the optical fiber has the macro bending loss of less than 0.05 dB/100 turns for 30 mm bending radius at a wavelength of 1550 nm in the second set of values.

In an embodiment of the present disclosure, the mode field diameter is in the range of 9.2 μm to 10.00 μm at wavelength of 1550 nm in the second set of values.

In an embodiment of the present disclosure, the dispersion value is in the range of −16.78 Ps/nm/km to −11.36 Ps/nm/km at a wavelength of 1310 nm in the second set of values.

In an embodiment of the present disclosure, the dispersion value is in the range of −4.02 Ps/nm/km to 0.15 Ps/nm/km at a wavelength of 1460 nm in the second set of values.

In an embodiment of the present disclosure, the dispersion value is in the range of 2.00 Ps/nm/km to 4.00 Ps/nm/km at a wavelength of 1530 nm in the second set of values.

In an embodiment of the present disclosure, the dispersion value is in the range of 3.00 Ps/nm/km to 5.00 Ps/nm/km at a wavelength of 1550 nm in the second set of values.

In an embodiment of the present disclosure, the dispersion value is in the range of 4.00 Ps/nm/km to 6.00 Ps/nm/km at a wavelength of 1565 nm in the second set of values.

In an embodiment of the present disclosure, the dispersion value is in the range of 5.77 Ps/nm/km to 11.26 Ps/nm/km at a wavelength of 1625 nm in the second set of values.

In an embodiment of the present disclosure, the attenuation is less than 0.22 Db/Km at a wavelength of 1550 nm in the second set of values.

BRIEF DESCRIPTION OF FIGURES

Figure 1A:
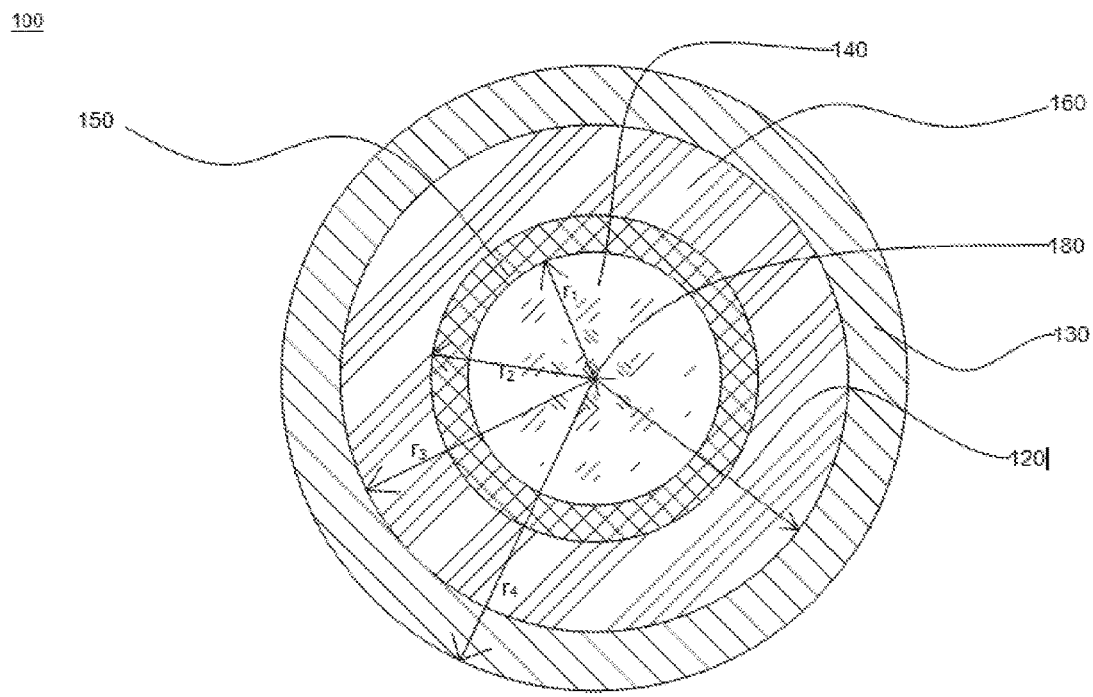
Figure 1B:
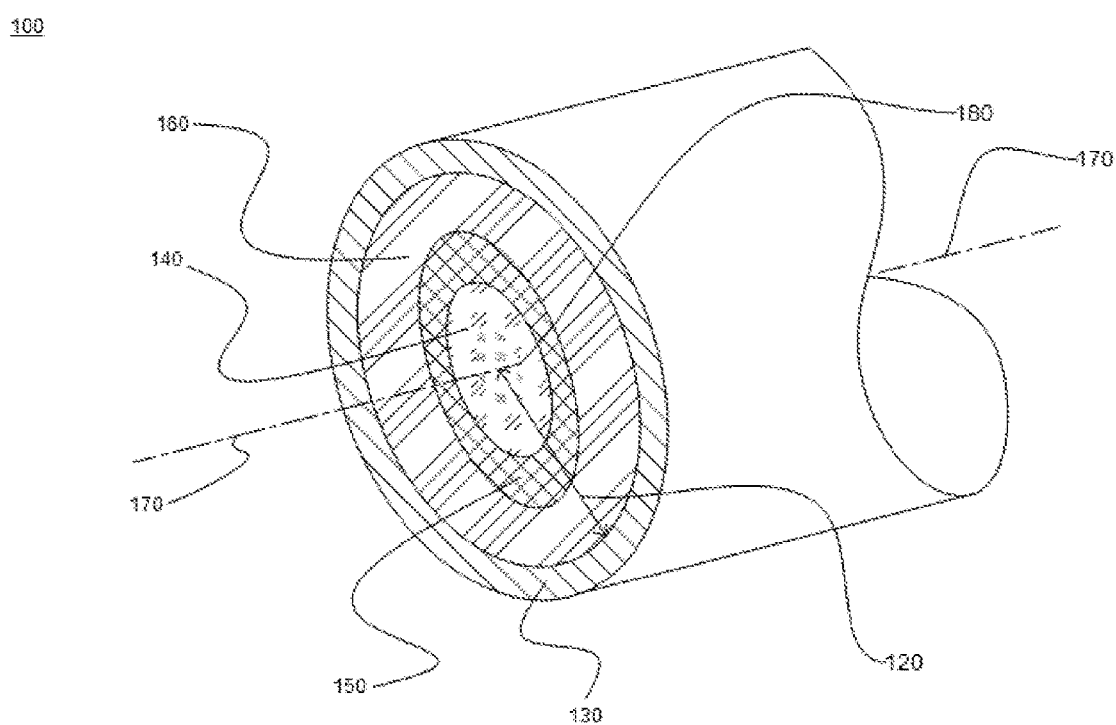
Figure 2:
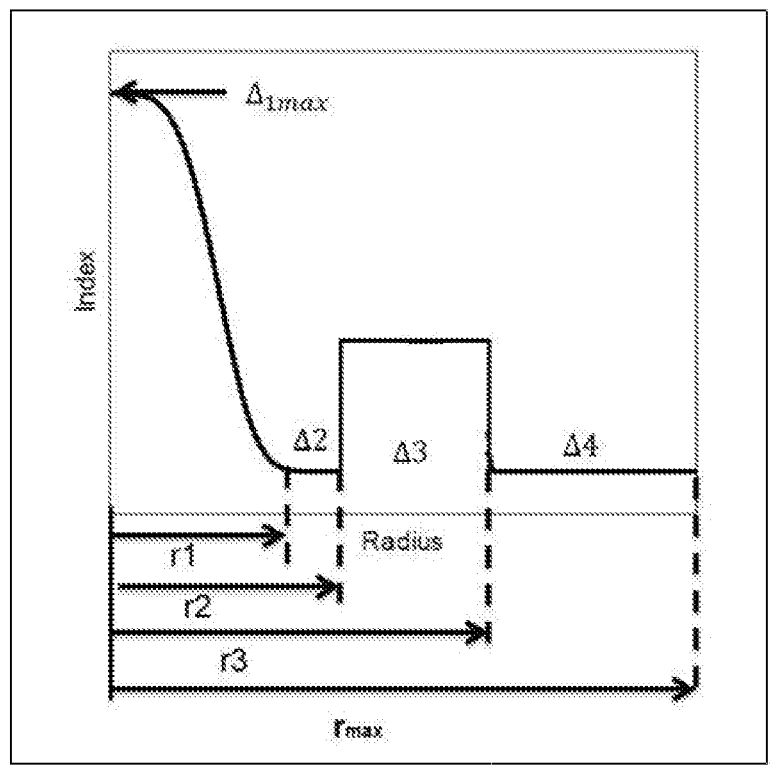

Having thus described the disclosure in general terms, reference will now be made to the accompanying figures, wherein:

FIG. 1A illustrates a cross-sectional view of an optical fiber 100 in accordance with various embodiments of the present disclosure;

FIG. 1B illustrates a perspective view of the optical fiber 100 in accordance with various embodiments of the present disclosure; and FIG. 2 illustrates a refractive index profile of the optical fiber 100 in accordance with an embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates a cross-sectional view of an optical fiber 100, in accordance with various embodiments of the present disclosure. The optical fiber 100 is a fiber used for transmitting information as light pulses from one end to another. In addition, the optical fiber 100 is a thin strand of glass or plastic capable of transmitting optical signals. The optical fiber 100 is configured to transmit large amounts of information over long distances with relatively low attenuation. Moreover, in an embodiment of the present disclosure, the optical fiber 100 is utilized for broadband communication applications.

In another embodiment of the present disclosure, the optical fiber 100 may be utilized for other applications. Going further, the optical fiber 100 is a non-zero dispersion shifted fiber. The non-zero dispersion shifted fiber is a single mode optical fiber used for long haul transmission systems. The single mode optical fiber is a fiber which is configured for transmission of single mode of light. In addition, the non-zero dispersion shifted fiber is a fiber used for reducing dispersion and macro bending losses in broadband communications. The dispersion corresponds to a spreading of the optical signals over time.

Moreover, the type of the dispersion which occurs inside the single mode optical fiber is chromatic dispersion. The chromatic dispersion is the spreading of the optical signals which results from different speeds of light rays travelling inside the optical fiber 100. Moreover, the chromatic dispersion occurs due to material dispersion and waveguide dispersion. Further, the material dispersion occurs due to a change in a refractive index of the optical fiber 100 with an optical frequency. Moreover, the waveguide dispersion occurs due to dependency of mode propagation on wavelength. In an embodiment of the present disclosure, the optical fiber 100 has a pre-determined value of dispersion.

In an embodiment of the present disclosure, the non-zero dispersion shifted fiber enables decrease of the dispersion over a range of wavelength and decreases non-linearity in the optical fiber 100. The range of wavelength corresponds to a range in which the optical fiber 100 is configured to operate. In an embodiment of the present disclosure, the optical fiber 100 is used for wavelength division multiplexing systems. The wavelength division multiplexing system is a system in which the optical signals with different wavelengths are combined and transmitted together. Accordingly, the optical signals are separated at another end.

In an embodiment of the present disclosure, the optical fiber 100 complies with specific telecommunication standards. The telecommunication standards are defined by International Telecommunication Union-Telecommunication (hereinafter "ITU-T"). In an embodiment of the present disclosure, the optical fiber 100 is compliant with G.655 recommendation standard set by the ITU-T.

Further, the ITU-T G.655 recommendation describes a geometrical, mechanical and transmission attributes of the single mode optical fiber (the optical fiber 100). In an embodiment of the present disclosure, the range of wavelength for the optical fiber 100 as per the ITU-T G.655 standard is 1460 nanometer to 1625 nanometer. Moreover, the ITU-T G.655 standard defines a plurality of attributes associated with the optical fiber 100. The plurality of attributes includes a mode field diameter, a cladding diameter, cable cut-off wavelength, macro bending loss, dispersion and refractive index. In addition, the plurality of attributes includes core concentricity error, cladding non-circularity, attenuation coefficient and the like.

The mode field diameter defines a section or area of the optical fiber 100 in which the optical signals travel. Moreover, the mode field diameter is larger than a core diameter at 1550 nm. The cable cut-off wavelength is a wavelength above which the single mode operation of the optical fiber 100 is enabled. In addition, the refractive index of the optical fiber is a property which determines the velocity with which the optical signal travels inside the optical fiber 100. In an embodiment of the present disclosure, each of the plurality of attributes has a specific value or a range of value.

In an embodiment of the present disclosure, the optical fiber 100 faces attenuation. Attenuation may be referred to the loss of light energy as the light pulse travels from one end of the cable to the other. In another embodiment of the present disclosure, the optical fiber 100 exhibits bending losses. The bend losses correspond to the losses that the optical fiber exhibits when they are bent. The bending loss mainly includes macro bending losses and micro bending losses. Bending losses rise very quickly once a certain critical bend radius is reached.

In an embodiment of the present disclosure the cable cut-off wavelength for any mode is defined as the maximum wavelength at which that mode will propagate. In an embodiment of the present disclosure the optical fiber 100 has an effective area. The effective area of the fundamental mode is a measure of the area over which the energy in the electric field is distributed.

Going further, the optical fiber 100 includes a core region 120 and a cladding region 130. The core region 120 is an inner part of the optical fiber 100 and the cladding region 130 is an outer part of the optical fiber 100. Moreover, the core region 120 is defined by a region around a central longitudinal axis 170 of the optical fiber 100 (as shown in FIG. 1B). The longitudinal axis 170 is an imaginary axis passes through the geometrical centre 180 of the optical fiber 100. In addition, the cladding region 130 surrounds the core region 120. The core region 120 and the cladding region 130 are formed along the central longitudinal axis 170 of the optical fiber 100. Moreover, the core region 120 and the cladding region 130 are formed during the manufacturing stage of the optical fiber 100.

In an embodiment of the present disclosure, the refractive index profile determines a relationship between the refractive index of the optical fiber 100 with a radius of the optical fiber 100. In addition, the refractive index profile illustrates a change in the refractive index of the optical fiber 100 with an increase in the radius of the optical fiber 100. Also, the refractive index profile is maintained as per a desired level based on a concentration of chemicals used for the production of the optical fiber 100. In an embodiment of the present disclosure, the production of the optical fiber 100 is carried out after construction of an optical fiber preform.

In an embodiment of the present disclosure, the radius of the optical fiber 100 is maintained under a pre-defined value set as per the ITU-T standards. In addition, the optical signals to be transmitted travel through the core region 120 of the optical fiber 100. The optical signals are confined inside the core region 120 based on a property of total internal reflection. In an embodiment of the present disclosure, the core region 120 is associated with a different refractive index profile.

In an embodiment of the present disclosure, the cladding region 130 is defined by a different refractive index profile. Moreover, the refractive index profile of the core region 120 and the cladding region 130 is shown through a single graph (FIG. 2). Going further, the optical fiber 100 includes the core region 120 (as stated above in the patent application). The core region 120 has the refractive index profile (as shown in the FIG. 2). In addition, the optical fiber 100 includes a plurality of annular regions in the core region 120 of the optical fiber 100. In an embodiment of the present disclosure, the core region 120 of the optical fiber 100 is divided into the plurality of annular regions.

Each of the plurality of regions is defined by a corresponding refractive index and a corresponding radius. In an embodiment of the present disclosure, the refractive index of each of the plurality of regions of the core region 120 is different. In an embodiment of the present disclosure, the radius of each of the plurality of regions of the core region 120 is different.

Further, in an embodiment of the present disclosure, the refractive index profile of the core region 120 of the optical fiber 100 changes from the centre 180 of the optical fiber 100 to the radius of the core. Moreover, the refractive index of each of the plurality of regions of the core region 120 has a pre-defined range of value (stated below in the patent application). In addition, the radius of each of the plurality of regions of the core region 120 has a pre-defined range of value (mentioned below in the patent application). In an embodiment of the present disclosure, the pre-defined range of value of the refractive index is set to enable predefined dispersion and low macro bending loss.

In an embodiment of the present disclosure, the pre-defined range of value of the refractive index of each of the plurality of regions is set to maintain the dispersion and macro bending loss in a pre-defined range or value. The pre-defined range or value is decided based on the ITU-T G.655 standard. Further, in an embodiment of the present disclosure, the pre-defined range of the value of the core radius is optimized to enable the predefined dispersion and low macro bending loss. In addition, each region of the plurality of regions has the corresponding refractive index value.

Further, in an embodiment of the present disclosure, the refractive index of each region of the plurality of regions is fixed over a cross-sectional area of each region. Going further, the core region 120 has a first annular region 140, a second annular region 150 and a third annular region 160. In an embodiment of the present disclosure, the plurality of regions includes the first annular region 140, the second annular region 150 and the third annular region 160. Moreover, the first annular region 140, the second annular region 150 and the third annular region 160 are concentrically arranged.

Further, the radius of the first annular region 140, the second annular region 150 and the third annular region 160 is optimized for the low macro bending loss and low dispersion. Moreover, the macro bending loss and the dispersion is optimized within a pre-defined limit specified by the ITU-T.

Furthermore, the first annular region 140 is defined from the central longitudinal axis 170 of the optical fiber 100 to a first radius r1 from the central longitudinal axis 170 of the optical fiber 100. The first annular region 140 has a refractive index delta1. The first annular region 140 has a parameter Y (gamma). The first annular region 140 of the optical fiber 100 is the central core region. The first annular region 140 has a super gaussian profile. In addition, the second annular region 150 is defined from the first radius r1 to a second radius r2 from the central longitudinal axis 170 of the optical fiber 100. The second annular region 150 has a refractive index delta2. Further, the third annular region 160 is defined from the second radius r2 to a third radius r3 from the central longitudinal axis 170 of the optical fiber 100. The third annular region 160 has a refractive index delta3. Furthermore, the fourth annular region is the cladding region 130 defined from the third radius r3 to a fourth radius r4 from the central longitudinal axis 170 of the optical fiber 100. The cladding region 130 has a refractive index delta4.

Furthermore, the expression used for the relative refractive index in percent for the optical fiber 100 is given by $\Delta$ (delta) %:

$$\Delta(delta)\% = 100 \times \left(\frac{n_i^2 - n_{cl}^2}{2 \times n_i^2}\right)$$

where,

'$n_{cl}$': average refractive index of the pure silica;

'$n_i$': refractive index of the layer; and

'$\Delta$ (delta) %': relative refractive index difference given in percentage.

Furthermore, the equation for super gaussian profile for the central core region of the optical fiber 100 is given by:

$$\Delta(r)\% = \Delta_{1max}\% \times \text{Exp}(-(r/a)^\gamma)$$

where,

'r': radial position from centre of the optical fiber 100;

'a': radial distance;

$\Delta$ % = $\Delta_{1max}$%/e; where 'e': natural algorithm

'$\gamma$': gamma is a positive number

The optical fiber 100 has a first set of values defined for a plurality of parameters of the optical fiber 100 including namely for the first radius r1, the first refractive index delta1, the Y (gamma), the second radius r2, the second refractive index delta2, the third radius r3, the third refractive index delta3, the fourth radius r4, the fourth refractive index delta4, the cutoff wavelength, the effective area, the macro bending loss, the mode field diameter, the dispersion value, the zero dispersion wavelength and the attenuation. The plurality of parameters may also include the radial distance 'a'.

The first radius r1 is in range of 4 microns to 5 microns in the first set of values. The first refractive index delta1 is in range of 0.5 to 0.57 in the first set of values. The Y (gamma) is in the range of 3 to 6 in the first set of values. The second radius r2 is in range of 5 microns to 6.5 microns in the first set of values. The second refractive index delta2 is zero in the first set of values. The third radius r3 is in range of 8.8 microns to 10.5 microns in the first set of values. The third refractive index delta3 is in range of 0.27 to 0.32 in the first set of values. The fourth radius r4 is 62.5 microns in the first set of values. The fourth refractive index delta4 is zero in the first set of values. The optical fiber has the cable cutoff wavelength of less than or equal to 1450 nm in the first set of values. The effective area is in the range of 66 um2 to 78 um2 at a wavelength of 1550 nm in the first set of values. The optical fiber has a macro bending loss of less than 0.1 dB/turn for 16 mm bending radius at a wavelength of 1625 nm in the first set of values. The optical fiber has a macro bending loss of less than 0.05 dB/100 turns for 30 mm bending radius at a wavelength of 1550 nm in the first set of values.

In an embodiment of the present disclosure, the first annular region in the core region has a super Gaussian profile. In an embodiment of the present disclosure, the mode field diameter is in the range of 9.2 µm to 10 µm at wavelength of 1550 nm in the first set of values. In an embodiment of the present disclosure, the dispersion value is in the range of −4.02 Ps/nm/km to 0.15 Ps/nm/km at a wavelength of 1460 nm in the first set of values. In an embodiment of the present disclosure, the dispersion value is in the range of 2.00 Ps/nm/km to 4.00 Ps/nm/km at a wavelength of 1530 nm in the first set of values. In an embodiment of the present disclosure, the dispersion value is in the range of 3.00 Ps/nm/km to 5.00 Ps/nm/km at a wavelength of 1550 nm in the first set of values. In an embodiment of the present disclosure, the dispersion value is in the range of 4.00 Ps/nm/km to 6.00 Ps/nm/km at a wavelength of 1565 nm in the first set of values. In an embodiment of the present disclosure, the dispersion value is in the range of 5.77 Ps/nm/km to 11.26 Ps/nm/km at a wavelength of 1625 nm in the first set of values. In an embodiment of the present disclosure, the attenuation is less than 0.22 db/km at a wavelength of 1550 nm in the first set of values.

The below mentioned embodiments of the optical fiber 100 fall under the first set of values corresponding to the plurality of parameters (as already mentioned above) of the optical fiber 100.

In an embodiment of the present disclosure the cable cut-off wavelength of the optical fiber 100 is less than 1450 nm. In addition, the radius r1 extended from the centre 180 of the longitudinal axis 170 to the first annular region 140 is 4.5 microns and refractive index delta1 of the first annular region 140 is 0.575. Further, the value of Y (gamma) is 3. Furthermore, the radius r2 extended from the centre 180 of the longitudinal axis 170 to the second annular region 150 is 6.5 microns and refractive index delta2 of the second annular region 150 is 0. Furthermore, the radius r3 extended from the centre 180 of the longitudinal axis 170 to the third annular region 160 is 10.5 microns and refractive index delta3 of the third annular region 160 is 0.27. Furthermore, the radial distance 'a' from the centre 180 of the longitudinal axis 170 of the optical fiber 100 is 2.95 microns. Furthermore, the dispersion at 1460 nm wavelength is −2.060 ps/nm/km, the dispersion at 1530 nm wavelength is 2.510 ps/nm/km and dispersion at 1550 nm wavelength is 3.85 ps/nm/km. Furthermore, the dispersion at 1565 nm wavelength is 4.66 ps/nm/km and the dispersion at 1625 nm wavelength is 8.87 ps/nm/km. Furthermore, the zero dispersion wavelength of the optical fiber 100 is 1497 nm. Furthermore, the mode field diameter of the optical fiber 100 at 1550 nm wavelength is 9.4 µm. Furthermore, the effective area of the optical fiber 100 at 1550 nm wavelength is 65.9 µm2. Furthermore, the attenuation of optical fiber 100 at 1550 nm wavelength is less than 0.22 db/km. Furthermore, the optical fiber has a macro bending loss of 0.012 dB/turn for 16 mm bending radius at a wavelength of 1625 nm.

In another embodiment of the present disclosure the cable cut-off wavelength of the optical fiber 100 is less than 1450 nm. In addition, the radius r1 extended from the centre 180 of the longitudinal axis 170 to the first annular region 140 is 4.7 microns and refractive index delta1 of the first annular region 140 is 0.56. Further, the value of Y (gamma) is 4. Furthermore, the radius r2 extended from the centre 180 of the longitudinal axis 170 to the second annular region 150 is 5.5 microns and refractive index delta2 of the second annular region 150 is 0. Furthermore, the radius r3 extended from the centre 180 of the longitudinal axis 170 to the third annular region 160 is 9.1 microns and refractive index delta3 of the third annular region 160 is 0.28. Furthermore, the radial distance 'a' from the centre 180 of the longitudinal axis 170 of the optical fiber 100 is 2.8 microns. Furthermore, the dispersion at 1460 nm wavelength is −3.17 ps/nm/km, the dispersion at 1530 nm wavelength is 2.41 ps/nm/km and dispersion at 1550 nm wavelength is 4.01 ps/nm/km. Furthermore, the dispersion at 1565 nm wavelength is 5.24 ps/nm/km and the dispersion at 1625 nm wavelength is 9.84 ps/nm/km. Furthermore, the zero dispersion wavelength of the optical fiber 100 is 1501 nm. Furthermore, the mode field diameter of the optical fiber 100 at 1550 nm wavelength is 9.63 µm. Furthermore, the effective area of the optical fiber 100 at 1550 nm wavelength is 70 µm2. Furthermore, the attenuation of optical fiber 100 at 1550 nm wavelength is less than 0.22 db/km. Furthermore, the optical fiber has a macro bending loss of 0.024 dB/turn for 16 mm bending radius at a wavelength of 1625 nm.

In yet another embodiment of the present disclosure the cable cut-off wavelength of the optical fiber 100 is less than 1450 nm. In addition, the radius r1 extended from the centre 180 of the longitudinal axis 170 to the first annular region 140 is 4.4 microns and refractive index delta1 of the first annular region 140 is 0.52. Further, the value of Y (gamma) is 5. Furthermore, the radius r2 extended from the centre 180 of the longitudinal axis 170 to the second annular region 150 is 6.4 microns and refractive index delta2 of the second annular region 150 is 0. Furthermore, the radius r3 extended from the centre 180 of the longitudinal axis 170 to the third annular region 160 is 10 microns and refractive index delta3 of the third annular region 160 is 0.28. Furthermore, the radial distance 'a' from the centre 180 of the longitudinal axis 170 of the optical fiber 100 is 3 microns. Furthermore, the dispersion at 1460 nm wavelength is −1.9 ps/nm/km, the dispersion at 1530 nm wavelength is 2.61 ps/nm/km and dispersion at 1550 nm wavelength is 4 ps/nm/km. Furthermore, the dispersion at 1565 nm wavelength is 5.03 ps/nm/km and the dispersion at 1625 nm wavelength is 9 ps/nm/km. Furthermore, the zero dispersion wavelength of the optical fiber 100 is 1490 nm. Furthermore, the mode field diameter of the optical fiber 100 at 1550 nm wavelength is 9.42 µm. Furthermore, the effective area of the optical fiber 100 at 1550 nm wavelength is 66.2 µm2. Furthermore, the attenuation of optical fiber 100 at 1550 nm wavelength is less than 0.22 db/km. Furthermore, the optical fiber has a macro bending loss of 0.019 dB/turn for 16 mm bending radius at a wavelength of 1625 nm.

In yet another embodiment of the present disclosure the cable cut-off wavelength of the optical fiber 100 is less than 1450 nm. In addition, the radius r1 extended from the centre 180 of the longitudinal axis 170 to the first annular region 140 is 4 microns and refractive index delta1 of the first annular region 140 is 0.54. Further, the value of Y (gamma) is 6. Furthermore, the radius r2 extended from the centre 180 of the longitudinal axis 170 to the second annular region 150 is 5 microns and refractive index delta2 of the second annular region 150 is 0. Furthermore, the radius r3 extended from the centre 180 of the longitudinal axis 170 to the third annular region 160 is 8.8 microns and refractive index delta3 of the third annular region 160 is 0.3. Furthermore, the radial distance 'a' from the centre 180 of the longitudinal axis 170 of the optical fiber 100 is 2.65 microns. Furthermore, the dispersion at 1460 nm wavelength is −3.72 ps/nm/km, the dispersion at 1530 nm wavelength is 2.64 ps/nm/km and dispersion at 1550 nm wavelength is 4.47 ps/nm/km. Furthermore, the dispersion at 1565 nm wavelength is 5.84 ps/nm/km and the dispersion at 1625 nm wavelength is 10.97 ps/nm/km. Furthermore, the zero dispersion wavelength of the optical fiber 100 is 1501.5 nm. Furthermore, the mode field diameter of the optical fiber 100 at 1550 nm wavelength is 9.99 µm. Furthermore, the effective area of the optical fiber 100 at 1550 nm wavelength is 78 µm2. Furthermore, the attenuation of optical fiber 100 at 1550 nm wavelength is less than 0.22 db/km. Furthermore, the optical fiber has a macro bending loss of 0.024 dB/turn for 16 mm bending radius at a wavelength of 1625 nm.

In yet another embodiment of the present disclosure the cable cut-off wavelength of the optical fiber 100 is less than 1450 nm. In addition, the radius r1 extended from the centre 180 of the longitudinal axis 170 to the first annular region 140 is 5 microns and refractive index delta1 of the first annular region 140 is 0.5. Further, the value of Y (gamma) is 6. Furthermore, the radius r2 extended from the centre 180 of the longitudinal axis 170 to the second annular region 150 is 6.2 microns and refractive index delta2 of the second annular region 150 is 0. Furthermore, the radius r3 is extended from the centre 180 of the longitudinal axis 170 to the third annular region 160 is 9.6 microns and refractive index delta3 of the third annular region 160 is 0.32. Furthermore, the radial distance 'a' from the centre 180 of the longitudinal axis 170 of the optical fiber 100 is 2.95 microns. Furthermore, the dispersion at 1460 nm wavelength is −2.84 ps/nm/km, the dispersion at 1530 nm is 2.45 ps/nm/km and dispersion at 1550 nm wavelength is 4.03 ps/nm/km. Furthermore, the dispersion at 1565 nm wavelength is 5.22 ps/nm/km and the dispersion at 1625 nm wavelength is 9.78 ps/nm/km. Furthermore, the zero dispersion wavelength of the optical fiber 100 is 1498.7 nm. Furthermore, the mode field diameter of the optical fiber 100 at 1550 nm wavelength is 9.97 µm. Furthermore, the effective area of the optical fiber 100 at 1550 nm wavelength is 76 µm2. Furthermore, the attenuation of optical fiber 100 at 1550 nm is less than 0.22 db/km. Furthermore, the optical fiber has a macro bending loss of 0.048 dB/turn for 16 mm bending radius at a wavelength of 1625 nm.

The optical fiber 100 has a second set of values defined for a plurality of parameters of the optical fiber 100 including the first radius r1, the first refractive index delta1, the Y (gamma), the second radius r2, the second refractive index delta2, the third radius r3, the third refractive index delta3, the fourth radius r4, the fourth refractive index delta4, the cutoff wavelength, the effective area, the macro bending loss, the mode field diameter, the dispersion value, the zero dispersion wavelength and the attenuation. The plurality of parameters may also include the radial distance 'a'.

The first radius r1 is in the range of 4 microns to 4.8 microns in the second set of values. The first refractive index delta1 is in the range of 0.51 to 0.57 in the second set of values. The Y (gamma) is in the range of 3 to 6 in the second set of values. The second radius r2 is in the range of 5 microns to 6.8 microns in the second set of values. The second refractive index delta2 is zero in the second set of values. The third radius r3 is in the range of 8.5 microns to 9.5 microns in the second set of values. The third refractive index delta3 is in the range of 0.25 to 0.3 in the second set of values. The fourth radius r4 is 62.5 microns in the second set of values. The fourth refractive index delta4 is zero in the second set of values. The optical fiber has the cable cut-off wavelength of less than or equal to 1260 nm in the second set of values. The effective area is in the range of 65 um2 to 73 um2 at a wavelength of 1550 nm in the second set of values. The optical fiber has the macro bending loss of less than 0.5 dB/turn for 16 mm bending radius at a wavelength of 1625 nm in the second set of values. The optical fiber has a macro bending loss of less than 0.05 dB/100 turns for 30 mm bending radius at a wavelength of 1550 nm in the second set of values.

In an embodiment of the present disclosure, the mode field diameter is in the range of 9.2 µm to 10.00 µm at wavelength of 1550 nm in the second set of values. In an embodiment of the present disclosure, the dispersion value is in the range of −16.78 Ps/nm/km to −11.36 Ps/nm/km at a wavelength of 1310 nm in the second set of values. In an embodiment of the present disclosure, the dispersion value is in the range of −4.02 Ps/nm/km to 0.15 Ps/nm/km at a wavelength of 1460 nm in the second set of values. In an embodiment of the present disclosure, the dispersion value is in the range of 2.00 Ps/nm/km to 4.00 Ps/nm/km at a wavelength of 1530 nm in the second set of values. In an embodiment of the present disclosure, the dispersion value is in the range of 3.00 Ps/nm/km to 5.00 Ps/nm/km at a wavelength of 1550 nm in the second set of values. In an embodiment of the present disclosure, the dispersion value is in the range of 4.00 Ps/nm/km to 6.00 Ps/nm/km at a wavelength of 1565 nm in the second set of values. In an embodiment of the present disclosure, the dispersion value is in the range of 5.77 Ps/nm/km to 11.26 Ps/nm/km at a wavelength of 1625 nm in the second set of values. In an embodiment of the present disclosure, the attenuation is less than 0.22 Db/Km at a wavelength of 1550 nm in the second set of values.

The below mentioned embodiments of the optical fiber 100 fall under the second set of values corresponding to the plurality of parameters (as already mentioned above) of the optical fiber 100.

In an embodiment of the present disclosure the cable cut-off wavelength of the optical fiber 100 is less than 1260 nm. In addition, the radius r1 extended from the centre 180 of the longitudinal axis 170 to the first annular region 140 is 4.2 microns and refractive index delta1 of the first annular region 140 is 0.57. Further, the value of Y (gamma) is 3. Furthermore, the radius r2 extended from the centre 180 of the longitudinal axis 170 to the second annular region 150 is 6 microns and refractive index delta2 of the second annular region 150 is 0. Furthermore, the radius r3 extended from centre 180 of the longitudinal axis 170 to the third annular region 160 is 9.5 microns and refractive index delta3 of the third annular region 160 is 0.25. Furthermore, the radial distance 'a' from the centre 180 of the longitudinal axis 170 of the optical fiber 100 is 2.8 microns. Furthermore, the dispersion at 1310 nm wavelength is −13.7 ps/nm/km, the dispersion at 1460 nm wavelength is −2.58 ps/nm/km and the dispersion at 1530 nm wavelength is 2.62 ps/nm/km. Furthermore, the dispersion at 1550 nm wavelength is 4.24 ps/nm/km, the dispersion at 1565 nm wavelength is 5.26 ps/nm/km and the dispersion at 1625 nm wavelength is 9.78 ps/nm/km. Furthermore, the zero dispersion wavelength of the optical fiber 100 is 1493.8 nm. Furthermore, the mode field diameter of the optical fiber 100 at 1550 nm wavelength is 9.65 μm. Furthermore, the effective area of the optical fiber 100 at 1550 nm wavelength is 69.5 μm2. Furthermore, the attenuation of optical fiber 100 at 1550 nm wavelength is less than 0.22 db/km. Furthermore, the optical fiber has a macro bending loss of 0.06 dB/turn for 16 mm bending radius at a wavelength of 1625 nm.

In an embodiment of the present disclosure the cable cut-off wavelength of the optical fiber 100 is less than 1260 nm. In addition, the radius r1 extended from the centre 180 of the longitudinal axis 170 to the first annular region 140 is 4.25 microns and refractive index delta1 of the first annular region 140 is 0.55. Further, the value of Y (gamma) is 4. Furthermore, the radius r2 extended from the centre 180 of the longitudinal axis 170 to the second annular region 150 is 5.45 microns and refractive index delta2 of the second annular region 150 is 0. Furthermore, the radius r3 extended from the centre 180 of the longitudinal axis 170 to the third annular region 160 is 9.05 microns and refractive index delta3 of the third annular region 160 is 0.25. Furthermore, the radial distance 'a' from the centre 180 of the longitudinal axis 170 of the optical fiber 100 is 2.7 microns. Furthermore, the dispersion at 1310 nm wavelength is −15.81 ps/nm/km, the dispersion at 1460 nm wavelength is −3.7 ps/nm/km and the dispersion at 1530 nm wavelength is 2.13 ps/nm/km. Furthermore, the dispersion at 1550 nm wavelength is 3.83 ps/nm/km, the dispersion at 1565 nm wavelength is 5.05 ps/nm/km and the dispersion at 1625 nm wavelength is 9.98 ps/nm/km. Furthermore, the zero dispersion wavelength of the optical fiber 100 is 1504.1 nm. Furthermore, the mode field diameter of the optical fiber 100 at 1550 nm wavelength is 9.83 μm. Furthermore, the effective area of the optical fiber 100 at 1550 nm wavelength is 73 μm2. Furthermore, the attenuation of optical fiber 100 at 1550 nm wavelength is less than 0.22 db/km. Furthermore, the optical fiber has a macro bending loss of 0.12 dB/turn for 16 mm bending radius at a wavelength of 1625 nm.

In an embodiment of the present disclosure the cable cut-off wavelength of the optical fiber 100 is less than 1260 nm. In addition, the radius r1 extended from the centre 180 of the longitudinal axis 170 to the first annular region 140 is 4.4 microns and refractive index delta1 of the first annular region 140 is 0.51. Further, the value of Y (gamma) is 5. Furthermore, the radius r2 extended from the centre 180 of the longitudinal axis 170 to the second annular region 150 is 5.9 microns and refractive index delta2 of the second annular region 150 is 0. Furthermore, the radius r3 extended from the centre 180 of the longitudinal axis 170 to the third annular region 160 is 9.3 microns and refractive index delta3 of the third annular region 160 is 0.25. Furthermore, the radial distance 'a' from the centre 180 of the longitudinal axis 170 of the optical fiber 100 is 2.9 microns. Furthermore, the dispersion at 1310 nm wavelength is −12.92 ps/nm/km, the dispersion at 1460 nm wavelength is −1.95 ps/nm/km and the dispersion at 1530 nm wavelength is 3.15 ps/nm/km. Furthermore, the dispersion at 1550 nm wavelength is 4.67 ps/nm/km, the dispersion at 1565 nm wavelength is 5.77 ps/nm/km and the dispersion at 1625 nm wavelength is 10.19 ps/nm/km. Furthermore, the zero dispersion wavelength of the optical fiber 100 is 1487.4 nm. Furthermore, the mode field diameter of the optical fiber 100 at 1550 nm wavelength is 9.69 μm. Furthermore, the effective area of the optical fiber 100 at 1550 nm wavelength is 70.2 μm2. Furthermore, the attenuation of optical fiber 100 at 1550 nm wavelength is less than 0.22 db/km. Furthermore, the optical fiber has a macro bending loss of 0.077 dB/turn for 16 mm bending radius at a wavelength of 1625 nm.

In an embodiment of the present disclosure the cable cut-off wavelength of the optical fiber 100 is less than 1260 nm. In addition, the radius r1 extended from the centre 180 of the longitudinal axis 170 to the first annular region 140 is 4 microns and refractive index delta1 of the first annular region 140 is 0.53. Further, the value of Y (gamma) is 6. Furthermore, the radius r2 extended from the centre 180 of the longitudinal axis 170 to the second annular region 150 is 5 microns and refractive index delta2 of the second annular region 150 is 0. Furthermore, the radius r3 extended from the centre 180 of the longitudinal axis 170 to the third annular region 160 is 8.5 microns and refractive index delta3 of the third annular region 160 is 0.27. Furthermore, the radial distance 'a' from the centre 180 of the longitudinal axis 170 of the optical fiber 100 is 2.65 microns. Furthermore, the dispersion at 1310 nm wavelength is −16.78 ps/nm/km, the dispersion at 1460 nm wavelength is −3.36 ps/nm/km and the dispersion at 1530 nm wavelength is 2.79 ps/nm/km. Furthermore, the dispersion at 1550 nm wavelength is 4.65 ps/nm/km, the dispersion at 1565 nm wavelength is 5.83 ps/nm/km and the dispersion at 1625 nm wavelength is 10.9 ps/nm/km. Furthermore, the zero dispersion wavelength of the optical fiber 100 is 1498.3 nm. Furthermore, the mode field diameter of the optical fiber 100 at 1550 nm wavelength is 9.99 μm. Furthermore, the effective area of the optical fiber 100 at 1550 nm wavelength is 76 μm2. Furthermore, the attenuation of optical fiber 100 at 1550 nm wavelength is less than 0.22 db/km. Furthermore, the optical fiber has a macro bending loss of 0.098 dB/turn for 16 mm bending radius at a wavelength of 1625 nm.

In an embodiment of the present disclosure the cable cut-off wavelength of the optical fiber 100 is less than 1260 nm. In addition, the radius r1 extended from the centre 180 of the longitudinal axis 170 to the first annular region 140 is 4.8 microns and refractive index delta1 of the first annular region 140 is 0.53. Further, the value of Y (gamma) is 4.5. Furthermore, the radius r2 extended from the centre 180 of the longitudinal axis 170 to the second annular region 150 is 6.8 microns and refractive index delta2 of the second annular region 150 is 0. Furthermore, the radius r3 extended from the centre 180 of the longitudinal axis 170 to the third annular region 160 is 9.3 microns and refractive index delta3 of the third annular region 160 is 0.3. Furthermore, the radial distance 'a' from the centre 180 of the longitudinal axis 170 of the optical fiber 100 is 2.95 microns. Furthermore, the dispersion at 1310 nm wavelength is −11.36 ps/nm/km, the dispersion at 1460 nm wavelength is −1.08 ps/nm/km and the dispersion at 1530 nm wavelength is 3.49 ps/nm/km. Furthermore, the dispersion at 1550 nm wavelength is 4.82 ps/nm/km, the dispersion at 1565 nm wavelength is 5.72 ps/nm/km and the dispersion at 1625 nm wavelength is 9.67 ps/nm/km. Furthermore, the zero dispersion wavelength of the optical fiber 100 is 1476.9 nm. Furthermore, the mode field diameter of the optical fiber 100 at 1550 nm wavelength is 9.34 μm. Furthermore, the effective area of the optical fiber 100 at 1550 nm wavelength is 65 μm2. Furthermore, the attenuation of optical fiber 100 at 1550 nm wavelength is less than 0.22 db/km. Furthermore, the optical fiber has a macro bending loss of 0.058 dB/turn for 16 mm bending radius at a wavelength of 1625 nm.

FIG. 2 illustrates a refractive index profile 200 of the optical fiber 100, in accordance with various embodiments of the present disclosure. It may be noted that to explain a graphical appearance of the refractive index profile 200, references will be made to the structural elements of the optical fiber 100. The refractive index profile 200 illustrates a relationship between the refractive index of the optical fiber 100 and the radius of the optical fiber 100. In an embodiment of the present disclosure, the refractive index profile 200 shows the change in the refractive index of the optical fiber 100 with the radius of the optical fiber 100. The first annular region 140 of the optical fiber 100 is the central core region. The central core region has a super gaussian profile. The dimension, structure, refractive index and Y (gamma) of the optical fiber 100 are already explained in detail above. (As explained in detail in FIG. 1A description).

Going further, the present disclosure provides numerous advantages over the prior art. The present disclosure provides the non-zero dispersion shifted optical fiber with the low dispersion and low cable cut-off wavelength. In addition, the optical fiber disclosed in the present disclosure exhibits low macro bending losses. Moreover, the optical fiber disclosed in the present disclosure has high effective area.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fiber comprising:
a core region defined by a region around a central longitudinal axis, the core region comprising:
a first annular region defined from the central longitudinal axis to a first radius $r_1$ from the central longitudinal axis of the optical fiber, wherein the first annular region has a first refractive index $delta_1$, wherein the first annular region in the core region has a parameter Y (gamma), wherein the first annular region has a super Gaussian profile;
a second annular region defined from the first radius $r_1$ to a second radius $r_2$ from the central longitudinal axis of the optical fiber, wherein the second annular region has a second refractive index $delta_2$;
a third annular region defined from the second radius $r_2$ to a third radius $r_3$ from the central longitudinal axis of the optical fiber, wherein the third annular region has a third refractive index $delta_3$, wherein the first annular region, the second annular region and the third annular region are concentrically arranged; and
a cladding region defined from the third radius $r_3$ to a fourth radius $r_4$ from the central longitudinal axis of the optical fiber, wherein the cladding region has a fourth refractive index $delta_4$, the cladding region is further defined by a fourth annular region concentrically surrounding the third annular region,
wherein the optical fiber has a first set of values defined for a plurality of parameters of the optical fiber comprising the first radius $r_1$, the first refractive index $delta_1$, the Y (gamma), the second radius $r_2$, the second refractive index $delta_2$, the third radius $r_3$, the third refractive index $delta_3$, the fourth radius $r_4$, the fourth refractive index $delta_4$, a cutoff wavelength, an effective area, a macro bending loss, a mode field diameter, a dispersion value, a zero dispersion wavelength and an attenuation,
wherein for the first set of values of the plurality of parameters, the first radius $r_1$ is in a range of 4 microns to 5 microns, the first refractive index $delta_1$ is in a range of 0.5 to 0.57, the Y (gamma) is in a range of 3 to 6, the second radius $r_2$ is in a range of 5 microns to 6.5 microns, the second refractive index $delta_2$ is zero, the third radius $r_3$ is in a range of 8.8 microns to 10.5 microns, the third refractive index $delta_3$ is in a range of 0.27 to 0.32, the fourth radius $r_4$ is 62.5 microns and the fourth refractive index $delta_4$ is zero,
wherein the optical fiber has a second set of values defined for the plurality of parameters of optical fiber comprising the first radius $r_1$, the first refractive index $delta_1$, the Y (gamma), the second radius $r_2$, the second refractive index $delta_2$, the third radius $r_3$, the third refractive index $delta_3$, the fourth radius $r_4$, the fourth refractive index $delta_4$, a cutoff wavelength, an effective area, a macro bending loss, a mode field diameter, a dispersion value, a zero dispersion wavelength and an attenuation, and
wherein for the second set of values of the plurality of parameters, the first radius $r_1$ is in a range of 4 microns to 4.8 microns, the first refractive index $delta_1$ is in a range of 0.51 to 0.57, the Y (gamma) is in a range of 3 to 6, the second radius $r_2$ is in a range of 5 microns to 6.8 microns, the second refractive index $delta_2$ is zero, the third radius $r_3$ is in a range of 8.5 microns to 9.5 microns, the third refractive index $delta_3$ is in a range of 0.25 to 0.3, the fourth radius $r_4$ is 62.5 microns and the fourth refractive index $delta_4$ is zero.

2. The optical fiber as claimed in claim 1, wherein the optical fiber has the cutoff wavelength of less than or equal to 1450 nm in the first set of values, wherein the optical fiber has the effective area in a range of 66 $um^2$ to 78 $um^2$ at a wavelength of 1550 nm in the first set of values, wherein the optical fiber has the macro bending loss of less than 0.1 dB/turn for 16 mm bending radius at a wavelength of 1625 nm in the first set of values, wherein the optical fiber has the macro bending loss of less than 0.005 dB/100 turns for 30 mm bending radius at a wavelength of 1550 nm in the first set of values, wherein the optical fiber has the mode field diameter in a range of 9.2 μm to 10 μm at a wavelength of 1550 nm in the first set of values, wherein the optical fiber has the dispersion value in a range of −4.02 Ps/nm/km to 0.15 Ps/nm/km at a wavelength of 1460 nm in the first set of values, wherein the optical fiber has the dispersion value in a range of 2.00 Ps/nm/km to 4.00 Ps/nm/km at a wavelength of 1530 nm in the first set of values, wherein the optical fiber has the dispersion value in a range of 3.00

Ps/nm/km to 5.00 Ps/nm/km at a wavelength of 1550 nm in the first set of values, wherein the optical fiber has the dispersion value in a range of 4.00 Ps/nm/km to 6.00 Ps/nm/km at a wavelength of 1565 nm in the first set of values, wherein the optical fiber has the dispersion value in a range of 5.77 Ps/nm/km to 11.26 Ps/nm/km at a wavelength of 1625 nm in the first set of values, wherein the optical fiber has the attenuation of less than 0.22 db/km at a wavelength of 1550 nm in the first set of values.

3. The optical fiber as claimed in claim 1, wherein the optical fiber has the cutoff wavelength of less than or equal to 1260 nm in the second set of values, wherein optical fiber has the effective area in a range of 65 um$^2$ to 73 um$^2$ at a wavelength of 1550 nm in the second set of values, wherein the optical fiber has the macro bending loss of less than 0.5 dB/turn for 16 mm bending radius at a wavelength of 1625 nm in the second set of values, wherein the optical fiber has the macro bending loss of less than 0.05 dB/100 turns for 30 mm bending radius at a wavelength of 1550 nm in the second set of values, wherein the optical fiber has the mode field diameter in a range of 9.20 μm to 10.00 μm at wavelength of 1550 nm in the second set of values, wherein the optical fiber has the dispersion value in a range of −16.78 Ps/nm/km to −11.36 Ps/nm/km at a wavelength of 1310 nm in the second set of values, wherein the optical fiber has the dispersion value in a range of −4.02 Ps/nm/km to 0.15 Ps/nm/km at a wavelength of 1460 nm in the second set of values, wherein the optical fiber has the dispersion value in a range of 2.00 Ps/nm/km to 4 Ps/nm/km at a wavelength of 1530 nm in the second set of values, wherein the optical fiber has the dispersion value in a range of 3.00 Ps/nm/km to 5.00 Ps/nm/km at a wavelength of 1550 nm in the second set of values, wherein the optical fiber has the dispersion value in a range of 4.00 Ps/nm/km to 6.00 Ps/nm/km at a wavelength of 1565 nm in the second set of values, wherein the optical fiber has the dispersion value in a range of 5.77 Ps/nm/km to 11.26 Ps/nm/km at a wavelength of 1625 nm in the second set of values, wherein the optical fiber has the attenuation of less than 0.22 DB/Km at a wavelength of 1550 nm in the second set of values.

4. An optical fiber comprising:
a core region defined by a region around a central longitudinal axis, the core region comprising:
a first annular region defined from the central longitudinal axis to a first radius $r_1$ from the central longitudinal axis of the optical fiber, wherein the first annular region has a first refractive index delta$_1$, wherein the first annular region in the core region has a parameter Y (gamma), wherein the first annular region has a super Gaussian profile;
a second annular region defined from the first radius $r_1$ to a second radius $r_2$ from the central longitudinal axis of the optical fiber, wherein the second annular region has a second refractive index delta$_2$;
a third annular region defined from the second radius $r_2$ to a third radius $r_3$ from the central longitudinal axis of the optical fiber, wherein the third annular region has a third refractive index delta$_3$, wherein the first annular region, the second annular region and the third annular region are concentrically arranged; and
a cladding region defined from the third radius $r_3$ to a fourth radius $r_4$ from the central longitudinal axis of the optical fiber, wherein the cladding region has a fourth refractive index delta$_4$, the cladding region is further defined by a fourth annular region concentrically surrounding the third annular region, wherein the optical fiber has a first set of values defined for a plurality of parameters of the optical fiber comprising the first radius $r_1$, the first refractive index delta$_1$, the Y (gamma), the second radius $r_2$, the second refractive index delta$_2$, the third radius $r_3$, the third refractive index delta$_3$, the fourth radius $r_4$, the fourth refractive index delta$_4$, a cutoff wavelength, an effective area, a macro bending loss, a mode field diameter, a dispersion value, a zero dispersion wavelength and an attenuation, wherein for the first set of values of the plurality of parameters, the first radius $r_1$ is in a range of 4 microns to 5 microns, the first refractive index delta$_1$ is in a range of 0.5 to 0.57, the Y (gamma) is in a range of 3 to 6, the second radius $r_2$ is in range of 5 microns to 6.5 microns, the second refractive index delta$_2$ is zero, the third radius $r_3$ is in range of 8.8 microns to 10.5 microns, the third refractive index delta$_3$ is in a range of 0.27 to 0.32, the fourth radius $r_4$ is 62.5 microns, the fourth refractive index delta$_4$ is zero, the optical fiber has the cutoff wavelength of less than or equal to 1450 nm, the optical fiber has the effective area in a range of 66 um$^2$ to 78 um$^2$ at a wavelength of 1550 nm, the optical fiber has the macro bending loss of less than 0.1 dB/turn for 16 mm bending radius at a wavelength of 1625 nm and the optical fiber has the macro bending loss of less than 0.005 dB/100 turns for 30 mm bending radius at a wavelength of 1550 nm, wherein the optical fiber has a second set of values defined for the plurality of parameters of optical fiber comprising the first radius $r_1$, the first refractive index delta$_1$, the Y (gamma), the second radius $r_2$, the second refractive index delta$_2$, the third radius $r_3$, the third refractive index delta$_3$, the fourth radius $r_4$, the fourth refractive index delta$_4$, a cutoff wavelength, an effective area, a macro bending loss, a mode field diameter, a dispersion value, a zero dispersion wavelength and an attenuation, and wherein for the second set of values of the plurality of parameters, the first radius $r_1$ is in a range of 4 microns to 4.8 microns, the first refractive index delta$_1$ is in a range of 0.51 to 0.57, the Y (gamma) is in a range of 3 to 6, the second radius $r_2$ is in a range of 5 microns to 6.8 microns, the second refractive index delta$_2$ is zero, the third radius $r_3$ is in a range of 8.5 microns to 9.5 microns, the third refractive index delta$_3$ is in a range of 0.25 to 0.3, the fourth radius $r_4$ is 62.5 microns, the fourth refractive index delta$_4$ is zero, the optical fiber has the cutoff wavelength of less than or equal to 1260 nm, the optical fiber has the effective area in a range of 65 um$^2$ to 73 um$^2$ at a wavelength of 1550 nm, the optical fiber has the macro bending loss of less than 0.5 dB/turn for 16 mm bending radius at a wavelength of 1625 nm and the optical fiber has the macro bending loss of less than 0.05 dB/100 turns for 30 mm bending radius at a wavelength of 1550 nm.

5. The optical fiber as claimed in claim 4, wherein the optical fiber has the mode field diameter in a range of 9.2 μm to 10 μm at a wavelength of 1550 nm in the first set of values, wherein the optical fiber has the dispersion value in a range of −4.02 Ps/nm/km to 0.15 Ps/nm/km at a wavelength of 1460 nm in the first set of values, wherein the optical fiber has the dispersion value in a range of 2.00 Ps/nm/km to 4.00 Ps/nm/km at a wavelength of 1530 nm in the first set of values, wherein the optical fiber has the dispersion value in a range of 3.00 Ps/nm/km to 5.00 Ps/nm/km at a wavelength of 1550 nm in the first set of values, wherein the optical fiber has the dispersion value in a range of 4.00 Ps/nm/km to 6.00 Ps/nm/km at a wavelength of 1565 nm in the first set of values, wherein the optical fiber has the dispersion value in a range of 5.77 Ps/nm/km to 11.26 Ps/nm/km at a wavelength of 1625 nm in the first set of values, wherein the optical fiber has the attenuation of less than 0.22 db/km at a wavelength of 1550 nm in the first set of values.

6. The optical fiber as claimed in claim 4, wherein the optical fiber has the mode field diameter in a range of 9.20 μm to 10.00 μm at wavelength of 1550 nm in the second set of values, wherein the optical fiber has the dispersion value in a range of −16.78 Ps/nm/km to −11.36 Ps/nm/km at a wavelength of 1310 nm in the second set of values, wherein the optical fiber has the dispersion value in a range of −4.02 Ps/nm/km to 0.15 Ps/nm/km at a wavelength of 1460 nm in the second set of values, wherein the optical fiber has the dispersion value in a range of 2.00 Ps/nm/km to 4 Ps/nm/km at a wavelength of 1530 nm in the second set of values, wherein the optical fiber has the dispersion value in a range of 3.00 Ps/nm/km to 5.00 Ps/nm/km at a wavelength of 1550 nm in the second set of values, wherein the optical fiber has the dispersion value in a range of 4.00 Ps/nm/km to 6.00 Ps/nm/km at a wavelength of 1565 nm in the second set of values, wherein the optical fiber has the dispersion value in a range of 5.77 Ps/nm/km to 11.26 Ps/nm/km at a wavelength of 1625 nm in the second set of values, wherein the optical fiber has the attenuation of less than 0.22 DB/Km at a wavelength of 1550 nm in the second set of values.

7. An optical fiber comprising:
a core region defined by a region around a central longitudinal axis, the core region comprising:
a first annular region defined from the central longitudinal axis to a first radius $r_1$ from the central longitudinal axis of the optical fiber, wherein the first annular region has a first refractive index $delta_1$, wherein the first annular region in the core region has a parameter Y (gamma), wherein the first annular region has a super Gaussian profile;
a second annular region defined from the first radius $r_1$ to a second radius $r_2$ from the central longitudinal axis of the optical fiber, wherein the second annular region has a second refractive index $delta_2$;
a third annular region defined from the second radius $r_2$ to a third radius $r_3$ from the central longitudinal axis of the optical fiber, wherein the third annular region has a third refractive index $delta_3$, wherein the first annular region, the second annular region and the third annular region are concentrically arranged; and
a cladding region defined from the third radius $r_3$ to a fourth radius $r_4$ from the central longitudinal axis of the optical fiber, wherein the cladding region has a fourth refractive index $delta_4$, the cladding region is further defined by a fourth annular region concentrically surrounding the third annular region,
wherein the optical fiber has a first set of values defined for a plurality of parameters of the optical fiber comprising the first radius $r_1$, the first refractive index $delta_1$, the Y (gamma), the second radius $r_2$, the second refractive index $delta_2$, the third radius $r_3$, the third refractive index $delta_3$, the fourth radius $r_4$, the fourth refractive index $delta_4$, a cutoff wavelength, an effective area, a macro bending loss, a mode field diameter, a dispersion value, a zero dispersion wavelength and an attenuation, wherein for the first set of values of the plurality of parameters, the first radius $r_1$ is in a range of 4 microns to 5 microns, the first refractive index $delta_1$ is in a range of 0.5 to 0.57, the Y (gamma) is in a range of 3 to 6, the second radius $r_2$ is in a range of 5 microns to 6.5 microns, the second refractive index $delta_2$ is zero, the third radius $r_3$ is in a range of 8.8 microns to 10.5 microns, the third refractive index $delta_3$ is in a range of 0.27 to 0.32, the fourth radius $r_4$ is 62.5 microns, the fourth refractive index $delta_4$ is zero, the optical fiber has the effective area in a range of 66 um$^2$ to 78 um$^2$ at a wavelength of 1550 nm, the optical fiber has the mode field diameter in a range of 9.2 μm to 10 μm at a wavelength of 1550 nm, the optical fiber has the dispersion value in a range of −4.02 Ps/nm/km to 0.15 Ps/nm/km at a wavelength of 1460 nm, the optical fiber has the dispersion value in a range of 2.00 Ps/nm/km to 4.00 Ps/nm/km at a wavelength of 1530 nm, the optical fiber has the dispersion value in a range of 3.00 Ps/nm/km to 5.00 Ps/nm/km at a wavelength of 1550 nm, the optical fiber has the dispersion value in a range of 4.00 Ps/nm/km to 6.00 Ps/nm/km at a wavelength of 1565 nm, the optical fiber has the dispersion value in a range of 5.77 Ps/nm/km to 11.26 Ps/nm/km at a wavelength of 1625 nm and the optical fiber has the attenuation of less than 0.22 db/km at a wavelength of 1550 nm.

wherein the optical fiber has a second set of values defined for the plurality of parameters of optical fiber comprising the first radius $r_1$, the first refractive index $delta_1$, the Y (gamma), the second radius $r_2$, the second refractive index $delta_2$, the third radius $r_3$, the third refractive index $delta_3$, the fourth radius $r_4$, the fourth refractive index $delta_4$, a cutoff wavelength, an effective area, a macro bending loss, a mode field diameter, a dispersion value, a zero dispersion wavelength and an attenuation, and wherein for the second set of values of the plurality of parameters, the first radius $r_1$ is in a range of 4 microns to 4.8 microns, the first refractive index $delta_1$ is in a range of 0.51 to 0.57, the Y (gamma) is in a range of 3 to 6, the second radius $r_2$ is in a range of 5 microns to 6.8 microns, the second refractive index $delta_2$ is zero, the third radius $r_3$ is in a range of 8.5 microns to 9.5 microns, the third refractive index $delta_3$ is in a range of 0.25 to 0.3, the fourth radius $r_4$ is 62.5 microns, the fourth refractive index $delta_4$ is zero, the optical fiber has the effective area in the range of 65 um$^2$ to 73 um$^2$ at a wavelength of 1550 nm, the optical fiber has the mode field diameter in a range of 9.20 μm to 10.00 μm at wavelength of 1550 nm, the optical fiber has the dispersion value in a range of −16.78 Ps/nm/km to −11.36 Ps/nm/km at a wavelength of 1310 nm, the optical fiber has the dispersion value in a range of −4.02 Ps/nm/km to 0.15 Ps/nm/km at a wavelength of 1460 nm, the optical fiber has the dispersion value in a range of 2.00 Ps/nm/km to 4 Ps/nm/km at a wavelength of 1530 nm, the optical fiber has the dispersion value in a range of 3.00 Ps/nm/km to 5.00 Ps/nm/km at a wavelength of 1550 nm, the optical fiber has the dispersion value in a range of 4.00 Ps/nm/km to 6.00 Ps/nm/km at a wavelength of 1565 nm, the optical fiber has the dispersion value in a range of 5.77 Ps/nm/km to 11.26 Ps/nm/km at a wavelength of 1625 nm and the optical fiber has the attenuation of less than 0.22 DB/Km at a wavelength of 1550 nm.

8. The optical fiber as claimed in claim 7, wherein the optical fiber has a cable cutoff wavelength of less than or equal to 1450 nm in the first set of values.

9. The optical fiber as claimed in claim 7, wherein the optical fiber has the macro bending loss of less than 0.1 dB/turn for 16 mm bending radius at a wavelength of 1625 nm in the first set of values.

10. The optical fiber as claimed in claim 7, wherein the optical fiber has the macro bending loss of less than 0.005 dB/100 turns for 30 mm bending radius at a wavelength of 1550 nm in the first set of values.

11. The optical fiber as claimed in claim 7, wherein the optical fiber has a cable cutoff wavelength of less than or equal to 1260 nm in the second set of values.

12. The optical fiber as claimed in claim 7, wherein the optical fiber has a macro bending loss of less than 0.5 dB/turn for 16 mm bending radius at a wavelength of 1625 nm in the second set of values.

13. The optical fiber as claimed in claim 7, wherein the optical fiber has a macro bending loss of less than 0.05 dB/100 turns for 30 mm bending radius at a wavelength of 1550 nm in the second set of values.

* * * * *